(12) United States Patent
Hsu et al.

(10) Patent No.: US 7,133,348 B2
(45) Date of Patent: Nov. 7, 2006

(54) PHASE LOCK LOOP FOR A CONTROLLER IN AN OPTICAL DISK SYSTEM AND METHODS THEREFOR

(75) Inventors: Tse-hsiang Hsu, Hsinchu (TW);
Chih-cheng Chen, Hsinchu (TW);
Chao Long Tsai, Chang Hwa Hsien (TW)

(73) Assignee: Mediatek Inc., Hsinchu (TW)

( * ) Notice: Subject to any disclaimer, the term of this patent is extended or adjusted under 35 U.S.C. 154(b) by 875 days.

(21) Appl. No.: 10/212,197

(22) Filed: Aug. 1, 2002

(65) Prior Publication Data
US 2004/0022157 A1 Feb. 5, 2004

(51) Int. Cl.
*G11B 5/09* (2006.01)

(52) U.S. Cl. .............................. 369/59.19; 369/47.48; 369/47.28; 369/59.1

(58) Field of Classification Search ..................... None
See application file for complete search history.

(56) References Cited

U.S. PATENT DOCUMENTS

| | | | |
|---|---|---|---|
| 6,909,678 B1* | 6/2005 | Morishima | 369/47.3 |
| 2002/0181362 A1* | 12/2002 | Koide | 369/47.28 |
| 2002/0186633 A1* | 12/2002 | Kai et al. | 369/47.51 |

* cited by examiner

*Primary Examiner*—Muhammad Edun

(57) ABSTRACT

The invention provides a phase lock loop (PLL) in a controller of an optical disk system and methods therefor. According to a preferred embodiment of the invention, the PLL comprises a write phase detector, a read phase detector, and a common read/write module shared by the write and read phase detectors. Further according to the invention, the common read/write module comprises a read/write mode selector coupled to the write and read phase detectors, a charge pump coupled to the mode selector, a loop filter coupled to the charge pump, and a voltage control oscillator (VCO) coupled to the loop filter.

59 Claims, 5 Drawing Sheets

PHASE LOCK LOOP FOR A CONTROLLER IN AN OPTICAL DISK SYSTEM AND METHODS THEREFOR

BACKGROUND OF THE INVENTION

1. Field of the Invention

The invention generally relates to optical disk systems and more particularly to a phase lock loop for a controller in an optical disk system and methods therefor.

2. Description of the Related Art

Optical disk systems such as digital versatile disk (DVD), compact disk (CD), DVD-ROM (digital video disk read only memory), DVD−RW, DVD+RW (digital video disk rewritable), CD-ROM and CD-RW are widely used in the art as the storage medium for data. Data are physically stored in the form of pits and lands patterned in a track on the disk. The tracks formed in a spiral line from the inner radius of the disk extending to the outer edge thereof. A pit is a location on the disk where data are recorded by creating a depression on the surface of the disk with respect to the lands. The lands are the areas between the pits in the tangential direction. When storing information on the disk, the length of the pits and lands are controlled according to a predetermined encoding format, such as eight-to-fourteen modulation (EFM). There are other encoding formats in the art suitable for patterning the puts and lands. EFM reduces errors by minimizing the number of zero-to-one and one-to-zero transitions where small pits are avoided. To retrieve information from the disk, light from a laser beam is directed onto the track where the light beam is reflected back to a photo-sensor. Because of different reflectivity in the pits and lands, the amount of reflected light changes at the transitions therebetween. The encoded pattern for the pits and lands modulates the reflected light beam. As the photo-sensor receives the reflected light beam, and outputs a modulated signal that is proportional to the energy of the light in the reflected light beam. In EFM, the data signal includes no less than two zeros and no more than ten zeros between logical transitions at the pit edges. A zero is indicated by no change in the energy of the reflected beam for at least two clock periods. A one is indicated by a change in the energy of the reflected light beam, i.e., a pit edge. Applying EFM, a pit or land includes a length corresponding to the amount of time for at least two and up to ten clock periods where a corresponding voltage is accordingly output.

In EFM encoding, the number of clock periods having a digital value of one should be equal to the number of clock periods having a digital value of zero over a period of time. A clock signal is derived from the digital data signal by a phase lock loop (PLL) in a controller of the optical disk. Provided that the clock includes a clock period T, the EFM signal has digital values of ones and zeroes for integer multiples of the clock period T. A PLL is provided in the controller for each functionality in operating the disk (such as reading and writing information). The PLL ensures proper clock speed in the EFM encoding. For multiple functionalities, such design requirements become cumbersome and inefficient in the art. Significant shortcomings include restrictions in the size and cost of implementation for the controller design of the optical disk.

Thus, there is a general need in the art for an optimally and efficiently designed controller for an optical disk, and more particularly, an optimally and efficiently designed PLL for the controller in an optical disk and associated methods therefor that overcome at least the aforementioned shortcomings in the art.

SUMMARY OF THE INVENTION

The invention provides a phase lock loop (PLL) in a controller of an optical disk system and methods therefor. According to a preferred embodiment of the invention, the PLL comprises a write phase detector, a read phase detector, and a common read/write module shared by the write and read phase detectors. Further according to the invention, the common read/write module comprises a read/write mode selector coupled to the write and read phase detectors, a charge pump coupled to the mode selector, a loop filter coupled to the charge pump, and a voltage control oscillator (VCO) coupled to the loop filter.

According to another preferred embodiment of the invention, the PLL comprises a write phase detector, an additional divider coupled to the write phase detector, a read phase detector, a multiplexer coupled to the write detector and the read detector, a charge pump coupled to the multiplexer, a loop filter coupled to the charge pump, a voltage control oscillator (VCO) coupled to the loop filter, a read divider provided between the voltage control oscillator (VCO) and the read phase detector, a write functional block (such as an encoder or a write clock) coupled to the voltage control oscillator (VCO), and an additional divider provided between the voltage control oscillator (VCO) and the write phase detector.

The PLL according to this particular embodiment of invention can service the write mode or the read mode for the controller, where a selecting signal respectively selects the write mode or the read mode using a multiplexer. For the write mode, the write reference data stream is input into a write divider where the incoming serial write reference is divided and subsequently input into the write phase detector. In the write phase detector, the phase of the data input is temporally compared with the phase of an output signal from the VCO. The output of the write phase detector comprises a pump-up (UP) signal and a pump down (DOWN) signal that in turn respectively direct the charge pump to either source or sink current to or from the loop filter for developing a voltage control signal for adjusting the speed of the VCO. The UP and DOWN signals respectively direct the charge pump for sourcing and sinking a particular amount of current to or from a capacitor in the loop filter. A voltage is developed as the charge pump current is sourced or sunk to or from the capacitor. The sign of the VCO control voltage variation depends on whether the phase of the data stream leads or lags the phase of the VCO output. The magnitude of the VCO control voltage is a function of the extent of the phase lead or lag. The PLL according to this particular embodiment of the invention ensures that the VCO output, which can be used as a timing reference, is locked in phase with the incoming serial write reference.

For the read mode (as selected by the selecting signal at multiplexer), the read data stream in the eight-to-fourteen modulation (EFM) format is input into the read phase detector. In the read phase detector, the phase of the data input is temporally compared with the phase of an output signal from the VCO. The output of the read phase detector comprises a pump-up (UP) signal and a pump down (DOWN) signal that in turn respectively direct the charge pump to either source or sink current to or from the loop filter for developing a voltage control signal for adjusting the speed of the VCO. The UP and DOWN signals respectively direct the charge pump for sourcing and sinking a particular amount of current to or from a capacitor in the loop filter. A voltage is developed as the charge pump current is sourced or sunk to or from the capacitor. The sign of the VCO control voltage variation depends on whether the phase of the data stream leads or lags the phase of the VCO output. The magnitude of the VCO control voltage is a function of the extent of the phase lead or lag. The PLL according to this particular embodiment of the invention ensures that the VCO output, which can be used as a timing reference, is locked in phase with the incoming serial read data stream.

The invention further provides a method for an optical disk system having a read and write operational modes. The method according to this particular embodiment of the invention comprises the steps of selecting a mode out of the read and write modes. If the write mode is selected, write reference data are input into a write phase detector. According to this particular embodiment, the method according to the invention comprises the steps of phase detecting the write reference data at the write phase detector, respectively outputting a pump-up signal and a pump-down signal to a charge pump from the write phase detector, and respectively sourcing and sinking a charge pump current at the charge pump in accordance with the pump-up and pump-down signals output from the write phase detector. As the charge pump current is output to a loop filter, the method according to this particular embodiment of the invention further comprises the steps of charging a capacitor in the loop filter with a first magnitude if the charge pump current is sourced and discharging the capacitor in the loop filter with a second magnitude if the charge pump current is sunk, and ensuring that the first magnitude and the second magnitude are equal by adjusting a voltage control oscillator (VCO) connected to the write phase detector. According to an additional embodiment, the method according to the invention further comprises the step of encoding data output from the voltage control oscillator (VCO). According to another embodiment, the method according to the invention further comprises the step of dividing the write reference data.

If the read mode is selected, the method according to the invention further comprises the steps of inputting read data into a read phase detector, phase detecting the read data at the read phase detector, respectively outputting a read pump-up signal and a read pump-down signal to the charge pump from the read phase detector, and respectively sourcing and sinking a read charge pump current at the charge pump in accordance with the pump-up and pump-down signals output from the read phase detector. In this particular embodiment of the method according to the invention, the read data are in an eight-to-fourteen modulation (EFM) format. As the charge pump current to the loop filter, the method according to the invention further comprises the steps of charging the capacitor in the loop filter with a first read magnitude if the read charge pump current is sourced and discharging the capacitor in the loop filter with a second read magnitude if the read charge pump current is sunk, and ensuring that the first read magnitude and the second read magnitude are equal by adjusting the voltage control oscillator (VCO) connected to the read phase detector. According to another embodiment, the method according to the invention further comprises the step of dividing the read data. According to yet another embodiment, the method according to the invention further comprises the step of dividing data output from the voltage control oscillator (VCO).

BRIEF DESCRIPTION OF THE DRAWINGS

The preferred and other embodiments of the invention are further described in detail below in conjunction with the accompanying drawings (not necessarily drawn to scale), in which.

DETAILED DESCRIPTION OF THE PREFERRED EMBODIMENTS

The details of the invention will be described hereinafter in conjunction with the appended drawings. Those ordinarily skilled in the art should understand that the following includes exemplary descriptions of the invention. Modifications and variations within the scopes and spirits of the invention are accordingly covered by the scope of the invention, which is defined by the appended claims and their equivalents.

According to a preferred embodiment of the invention, the PLL comprises a write phase detector, a read phase detector in parallel to the write phase detector, and a common read/write module shared by the write and read phase detectors. Further according to the invention, the common read/write module comprises a read/write mode selector connected to the write and read phase detectors, a charge pump serially connected to the mode selector, a loop filter serially connected to the charge pump, and a voltage control oscillator (VCO) serially connected to the loop filter.

Figure 1:
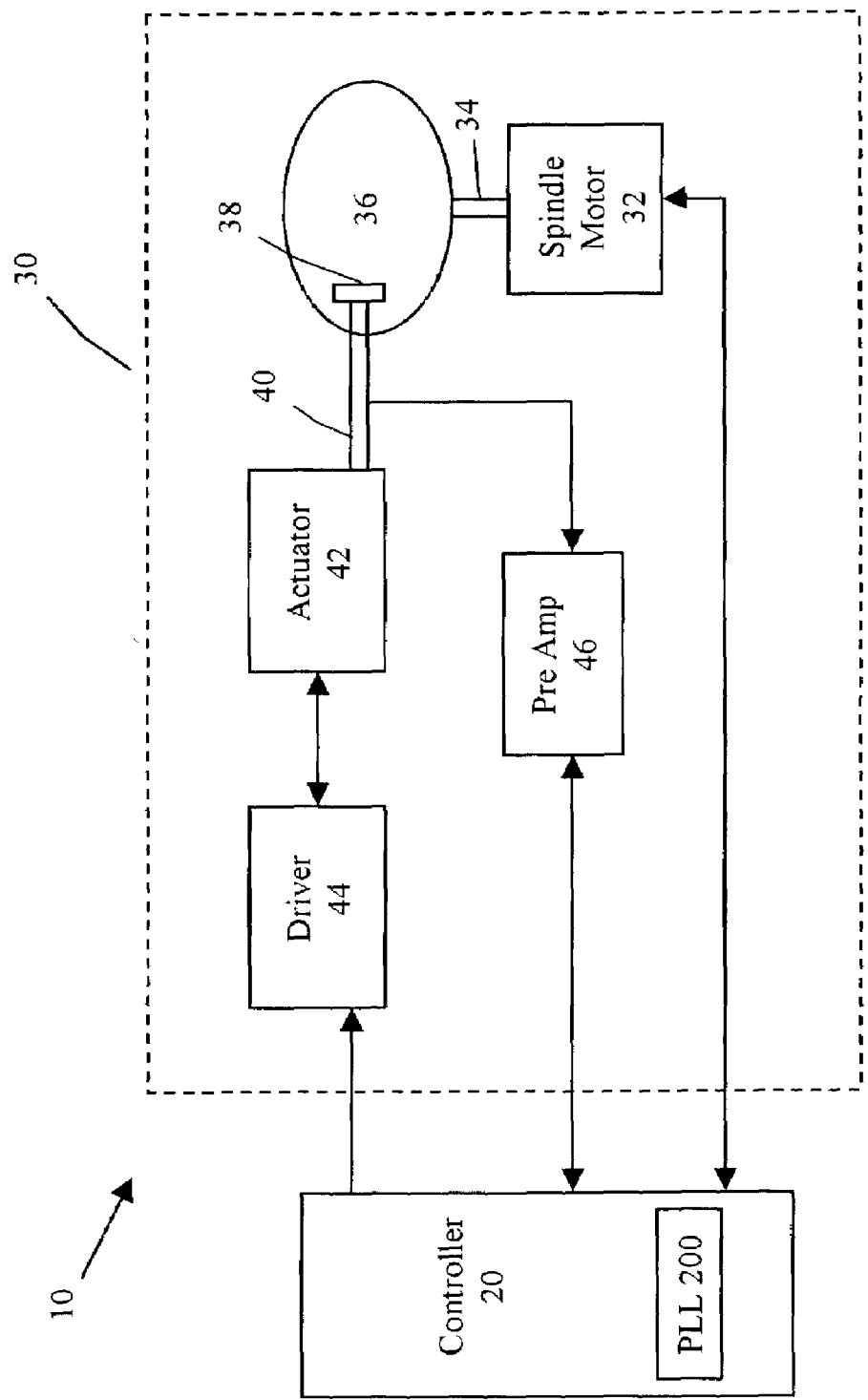
FIG. 1 is a schematic view generally illustrating an optical disk system according to the invention.

FIG. 1 is a schematic view that generally illustrates an optical system 10 according to the invention. An optical disk system 10 having a controller 20 that connects to a disk drive 30 such as an optical disk drive. The optical disk drive 30 can be a digital video disk (DVD), compact disk (CD), DVD-ROM (digital video disk read only memory), DVD–RW (digital video disk read write), DVD+RW (digital video disk rewritable), DVD-RAM (digital video disk random access memory) and CD-RW (compact disk rewritable). The optical system 10 can also serve as a computer storage medium in a personal computer (PC), workstation, notebook computer, palmtop computer, personal digital assistant (PDA), or wireless computer. In the disk drive 30, a spindle motor 32 is connected to a spindle 34 that supports at least one optical disk 36. In response to control signals from the controller 20, the spindle motor rotates the spindle 34 and thus disk 36. As the disk 36 rotates, an optical head 38 reads information from or writes information to the disk 36. The optical head 38 is supported by an actuator arm 40 which is connected to an actuator 42. A motor driver 44 is connected to the actuator 42 to move it to position the head 38 with respect to a target track for reading or writing information on the disk 36. A preamplifier 46 receives the analog signal from the head 38 and outputs it, along with other signals, to the controller 20 where a PLL 200 therein ensures proper clock speed in the EFM encoding.

Figure 2:
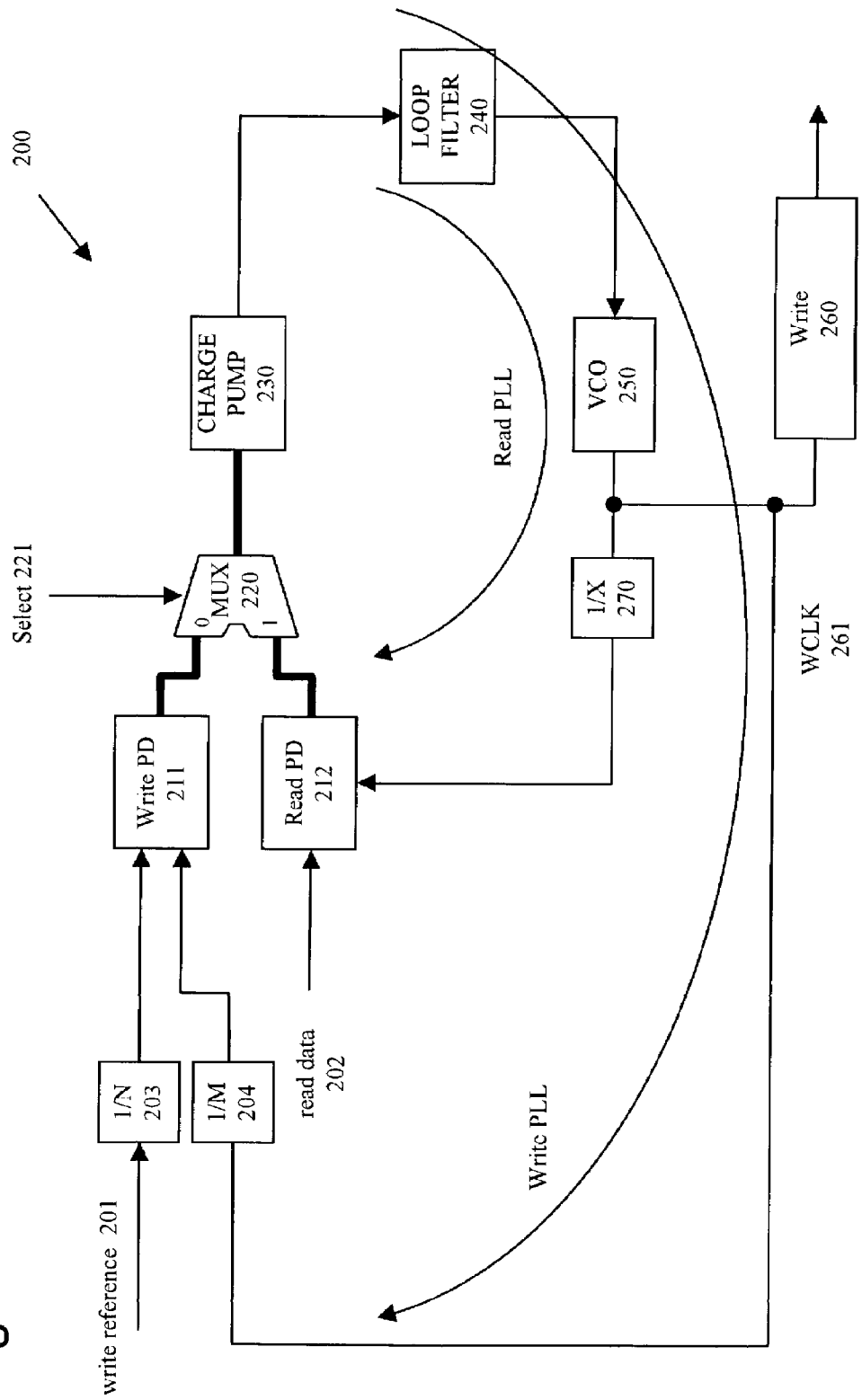
FIG. 2 is a schematic view illustrating a preferred embodiment of the phase lock loop (PLL) in the controller of the optical disk system according to the invention.

FIG. 2 is a schematic view that illustrates a preferred embodiment of the phase lock loop (PLL 200) in the controller 20 of the optical disk system 10 according to the invention. According to the invention, the phase lock loop (PLL 200) comprises a write phase detector 211, a read phase detector 212 in parallel to the write phase detector 211, and a common read/write module shared by the write and read phase detectors (211 and 212). Further according to the invention, the common read/write module comprises a read/write mode selector 220 connected to the write and read phase detectors (211 and 212), a charge pump 230 serially connected to the mode selector 220, a loop filter 240 serially connected to the charge pump 230, and a voltage control oscillator (VCO 250) serially connected to the loop filter 240.

According to FIG. 2, the phase lock loop (PLL 200) in the controller 20 of the optical disk system 10 comprises a write phase detector 211, a write divider 203 connected to the write phase detector 211, a read phase detector 212 in parallel to the write phase detector 211, a mode selector (multiplexer 220) connected to the write detector 211 and the read detector 212, a charge pump 230 serially connected to the multiplexer 220, a loop filter 240 serially connected to the charge pump 230, a voltage control oscillator (VCO 250) serially connected to the loop filter 240, a read divider 270 serially provided between the voltage control oscillator (VCO 250) and the read phase detector 212, an a write functional block 260 connected to the voltage control oscillator (VCO 250) for outputting encoded write data to the controller 20, and an additional divider 204 serially provided between the voltage control oscillator (VCO 250) and the write phase detector 211. Each of the write phase detector 211 and the read phase detector 212 produces a series of up or down pulses which are used for switching the charge pump 230. The charge pump 230 feeds pulses of current to a loop filter 240 and a capacitor therein, which has the effect of charging the capacitor up or down. As the capacitor is charged up and down, a voltage that respectively rises and falls is output for controlling the voltage control oscillator (VCO 250).

The PLL 200 according to the invention can serve the write mode or the read mode for the controller 20, where the selecting signal 221 respectively selects the write mode or the read mode through the multiplexer 220. For the write mode, the write reference data stream 201 is input into the write divider 203 where the incoming serial write reference 201 is divided by an integer N and subsequently input into the write phase detector 211. In the write phase detector 211, the occurrence of the edge (i.e., its phase) of the data input is temporally compared with the occurrence of the edge (i.e., phase) of an output signal from the VCO 250. The output of the write phase detector 211 comprises a pump-up (UP) signal and a pump down (DOWN) signal that in turn respectively direct the charge pump 230 to either source or sink current to or from the loop filter 240 for developing a voltage control signal for adjusting the speed of the VCO 250. The write phase detector 211 issues an UP signal if the phase of the data input leads the VCO signal, or a DOWN signal if the phase of the data input lags the signal from the VCO 250. The UP and DOWN signals respectively direct the charge pump 230 for sourcing and sinking a particular amount of current to or from a capacitor in the loop filter 240. A voltage is developed as the charge pump current is sourced or sunk to or from the capacitor. The sign of the VCO control voltage variation depends on whether the phase of the data stream leads or lags the phase of the VCO output (WCLK 261). The magnitude of the VCO control voltage is a function of the extent of the phase lead or lag. The PLL 200 accordingly ensures that the VCO output 261, which can be used as a timing reference, is locked in phase with the incoming serial write reference 201. The VCO output 261 can also be encoded at a write functional block 260 for writing the output data in the controller 20 and subsequently the optical disk system 10 (or optical disk 36). The write functional block can serve as an encoder or a time clock for outputting a write clock (WCLK 261) to the write phase detector 211.

For the read mode (as selected by the selecting signal 221 at multiplexer 220), the read data stream 202 in the eight-to-fourteen modulation (EFM) format is input into the the read phase detector 212. In the read phase detector 212, the occurrence of the edge (i.e., its phase) of the data input is temporally compared with the occurrence of the edge (i.e., phase) of an output signal from the VCO 250. The output of the read phase detector 212 comprises a pump-up (UP) signal and a pump down (DOWN) signal that in turn respectively direct the charge pump 230 to either source or sink current to or from the loop filter 240 for developing a voltage control signal for adjusting the speed of the VCO 250. The read phase detector 212 issues an UP signal if the phase of the data input leads the VCO signal, or a DOWN signal if the phase of the data input lags the signal from the VCO 250. The UP and DOWN signals respectively direct the charge pump 230 for sourcing and sinking a particular amount of current to or from a capacitor in the loop filter 240. A voltage is developed as the charge pump current is sourced or sunk to or from the capacitor. The sign of the VCO control voltage variation depends on whether the phase of the data stream leads or lags the phase of the VCO output which is then divided by an integer X at the additional divider 270. The magnitude of the VCO control voltage is a function of the extent of the phase lead or lag. The PLL 200 accordingly ensures that the VCO output, which can be used as a timing reference, is locked in phase with the incoming serial read 202.

Figure 2A:
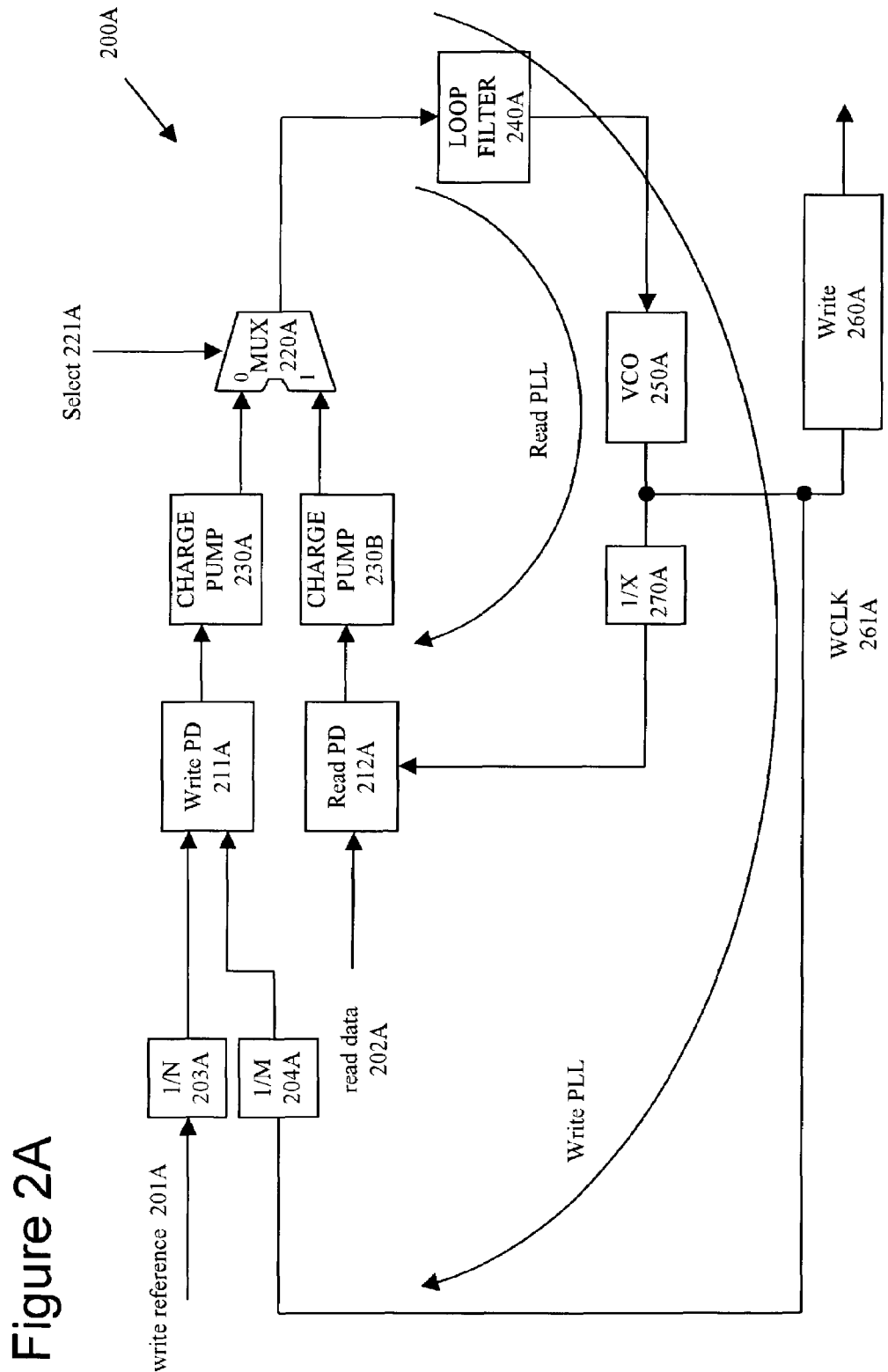
FIG. 2A is a schematic view illustrating another embodiment of the phase lock loop (PLL) in the controller of the optical disk system according to the invention.

FIG. 2A is a schematic view illustrating another embodiment of the phase lock loop (PLL) in the controller of the optical disk system according to the invention. According to this particular embodiment of the invention, the phase lock loop (PLL 200A) comprises a write phase detector 211A serially connected to a write charge pump 230A, a read phase detector 212A serially connected to a read charge pump 230B where the read phase detector 212A is in parallel to the write phase detector 211A, and a common read/write module shared by the write and read phase detectors (211A and 212A). Further according to the invention, the common read/write module comprises a read/write mode selector 220A connected to the write and read charge pumps (230A and 230B), a loop filter 240A serially connected to the mode selector 220A, and a voltage control oscillator (VCO 250A) serially connected to the loop filter 240A.

According to FIG. 2A, the phase lock loop (PLL 200) in the controller 20 of the optical disk system 10 comprises a write phase detector 211A, a write divider 203A connected to the write phase detector 211A, a read phase detector 212A in parallel to the write phase detector 211A, a write charge pump 230A serially connected to the write phase detector 211A, a read charge pump 230B serially connected to the read phase detector 212A where the read charge pump 230B is in parallel with the write charge pump 230A, a mode selector (multiplexer 220A) connected to the write and read charge pumps (230A and 230B), a loop filter 240A serially connected to the mode selector 220A, a voltage control oscillator (VCO 250A) serially connected to the loop filter 240, a read divider 270A serially provided between the voltage control oscillator (VCO 250A) and the read phase detector 212A, an a write functional block 260A connected to the voltage control oscillator (VCO 250A) for outputting encoding clock to the controller 20, and an additional divider 204A serially provided between the voltage control oscillator (VCO 250A) and the write phase detector 211A. The write functional block 260A can serve as an encoder or a time clock for outputting a write clock (WCLK 261A) to the write phase detector 211A. Each of the write phase detector 211A and the read phase detector 212A produces a series of up or down pulses which are used for respectively switching the charge pumps 230A and 230B. The charge pumps 230A and 230B respectively feed pulses of current to the loop filter 240A and a capacitor therein, which has the effect of charging the capacitor up or down. As the capacitor is charged up and down, a voltage that respectively rises and falls is output for controlling the voltage control oscillator (VCO 250A).

Figure 3:
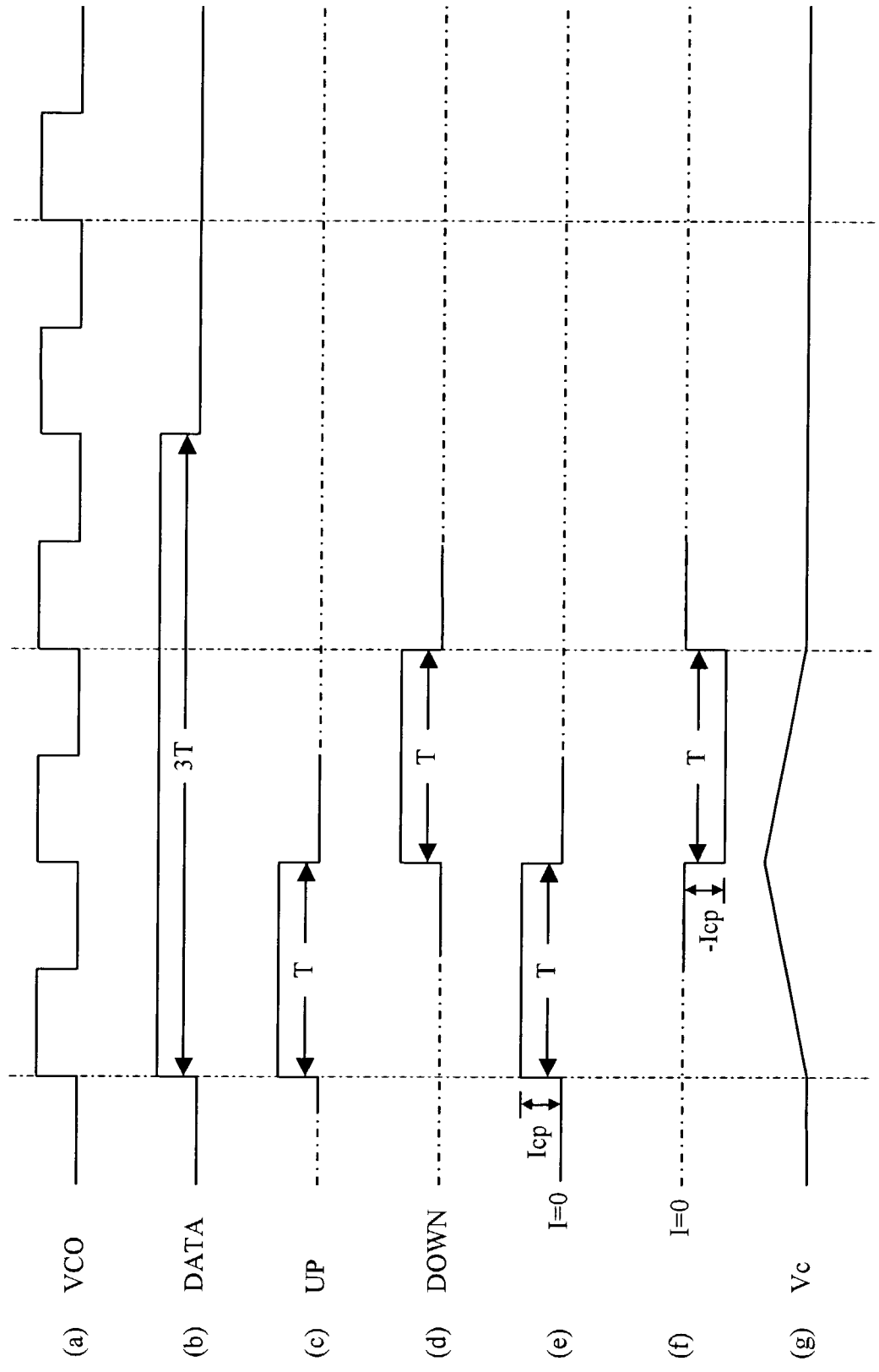
FIGS. 3a through 3g are a series of waveform diagrams schematically illustrating the operational characteristics of the phase lock loop (PLL) according to a preferred embodiment of the invention.

FIGS. 3a through 3g are waveform diagrams that schematically illustrate the operational characteristics of the phase lock loop (PLL) according to a preferred embodiment of the invention. In FIG. 3a, the VCO 250 develops a VCO data stream and provided to the VCO input of the phase detector 211. In FIG. 3b, the occurrence of a data ONE (for a period of 3T) is followed by a sequence of data zeroes as would be provided at the data input of the read phase detector 212. FIGS. 3c and 3d respectively illustrate a pump-up (UP) and a pump-down (DOWN) pulse provided by the read phase detector 21212 during correction cycles in which no data ONE bit appears. Referring to FIGS. 3c and 3d, the read phase detector 21212 issues a pump-up (UP) signal with a characteristic width T immediately followed by a pump-down (DOWN) signal with generally the same pulse width T. Even though only a single UP signal and a single DOWN signal are respectively depicted in FIGS. 3c and 3d, it is understood that the read phase detector 212 can issue continuous UP and DOWN signals which are not necessarily 180 degrees out of phase with one another. The UP and DOWN pulses give rise to positive and negative charge pump currents ($+I_{cp}$ and $-I_{cp}$) at the charge pump 230, as respectively illustrated in FIGS. 3e and 3f. A positive charge pump current $+I_{cp}$ represents current sourced to a capacitor in the loop filter 240 of the PLL 200 in response to a pump-up (UP) signal issued by the read phase detector 212. Conversely, a negative charge pump current $-I_{cp}$ represents current sunk from the capacitor in the loop filter 240 in response to a pump-down (DOWN) signal from the phase detector 212. Each of the charge pump currents $+I_{cp}$ and $-I_{cp}$ includes a specific magnitude $I_{cp}$ with a characteristic pulse length generally equal to the pulse length T of the UP and DOWN pulses. Referring to FIG. 3g, a positive charge pump current $+I_{cp}$ causes a charge to accumulate in a capacitor in the loop filter 240 that results in a linear voltage characteristic in the positive direction being applied to the $V_c$ output of the loop filter 240. As the charge pump current changes from positive to negative, the negative current $-I_{cp}$ removes the charge from the capacitor in the loop filter 240, causing the $V_c$ voltage to decline in a linear fashion to its originally held value. If a phase comparison takes place with a phase lead or lag detected by the read phase detector 212, the final $V_c$ value will be different from the initial $V_c$ value. In order for $V_c$ to retain its nominal value following a correction cycle, it is necessary that the amount of charge introduced to the capacitor in the loop filter 240 is equal to the amount of charge removed from that capacitor during the correction cycle. Thus, it is necessarily true that the magnitude of the positive charge pump current $+I_{cp}$ sourced to the capacitor in the loop filter 240 is equal to the magnitude of the negative charge pump current $-I_{cp}$ sunk from the capacitor. Accordingly, the current waveforms of FIGS. 3e and 3f must be symmetrical so that the average of the two currents sums to zero.

Figure 4:
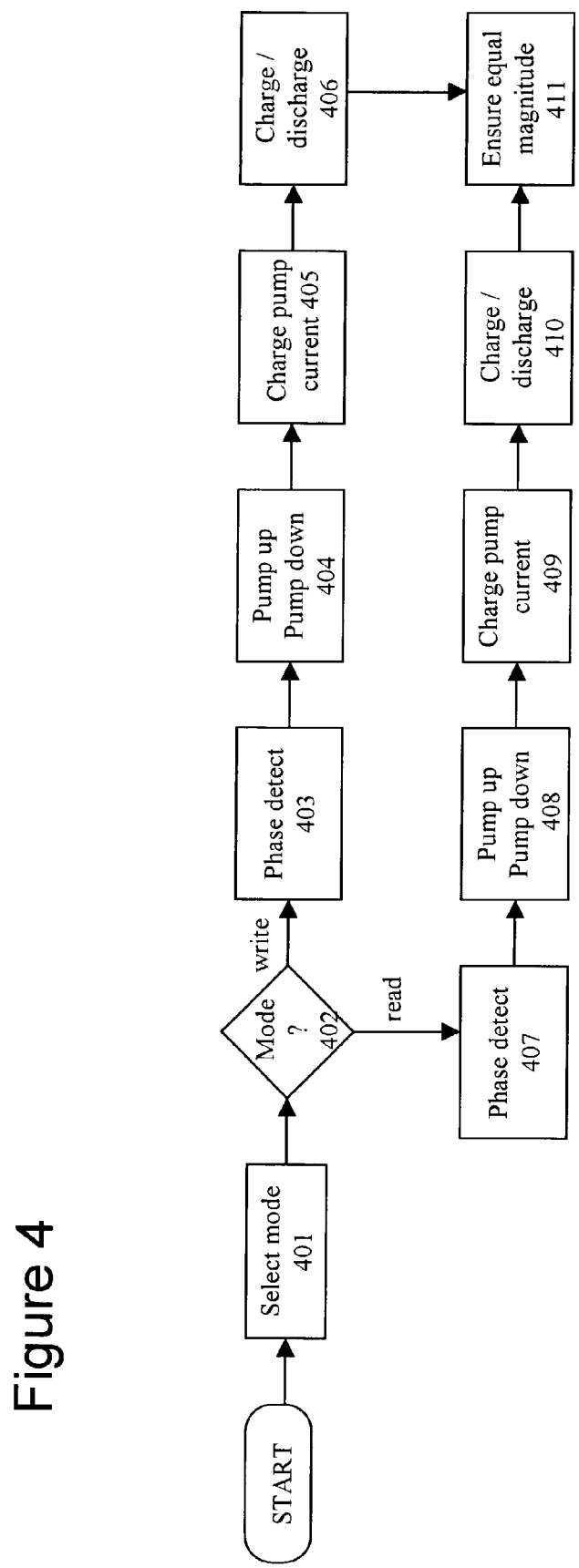
FIG. 4 is a flow diagram schematically illustrating a particular embodiment of the method according to the invention for an optical disk system having a read and write operational modes.

FIG. 4 is a flow diagram schematically illustrating a particular embodiment of the method according to the invention for an optical disk system having a read and write operational modes. The method according to this particular embodiment of the invention comprises the steps of selecting a mode out of the read and write modes in step 401. The operational mode can also toggle between the read and write modes according to predetermined conditions such as memory usage. If the write mode is selected according to step 402, write reference data are input into a write phase detector. According to this particular embodiment, the method according to the invention comprises the steps of phase detecting the write reference data at the write phase detector (step 403), respectively outputting a pump-up signal and a pump-down signal to a charge pump from the write phase detector (step 404), and respectively sourcing and sinking a charge pump current at the charge pump in accordance with the pump-up and pump-down signals output from the write phase detector (step 405). As the charge pump current is output to a loop filter, the method according to this particular embodiment of the invention further comprises the steps of charging a capacitor in the loop filter with a first magnitude if the charge pump current is sourced and discharging the capacitor in the loop filter with a second magnitude if the charge pump current is sunk (step 406), and ensuring that the first magnitude and the second magnitude are equal by adjusting a voltage control oscillator (VCO) connected to the write phase detector (step 411).

According to an additional embodiment, the method according to the invention further comprises the step of encoding data output from the voltage control oscillator (VCO). According to another embodiment, the method according to the invention further comprises the step of dividing the write reference data.

If the read mode is selected per step 402, the method according to the invention further comprises the steps of inputting read data into a read phase detector, phase detecting the read data at the read phase detector (step 407), respectively outputting a read pump-up signal and a read pump-down signal to the charge pump from the read phase detector (step 408), and respectively sourcing and sinking a read charge pump current at the charge pump in accordance with the pump-up and pump-down signals output from the read phase detector (step 409). In this particular embodiment of the method according to the invention, the read data are in an eight-to-fourteen modulation (EFM) format. As the charge pump current to the loop filter, the method according to the invention further comprises the steps of charging the capacitor in the loop filter with a first read magnitude if the read charge pump current is sourced and discharging the capacitor in the loop filter with a second read magnitude if the read charge pump current is sunk (step 410), and ensuring that the first read magnitude and the second read magnitude are equal by adjusting the voltage control oscillator (VCO) connected to the read phase detector (step 411).

According to another embodiment, the method according to the invention further comprises the step of dividing the read data. According to yet another embodiment, the method according to the invention further comprises the step of dividing data output from the voltage control oscillator (VCO).

The method according to this particular embodiment of the invention can be implemented in an optical disk system with an optical disk including a digital video disk (DVD), compact disk (CD), DVD-ROM (digital video disk read only memory), DVD-R/RW, DVD+R/RW (digital video disk read write), CD-ROM (compact disk read only memory) or CD-RW (compact disk read write). The method according to this embodiment can also be implemented in a computer storage medium in a personal computer (PC), workstation, notebook computer, palmtop computer, personal digital assistant (PDA), or wireless computer.

Although the invention has been described with reference to the preferred embodiments, it will be understood that the invention is not limited to the details described thereof. Substitutions and modifications have been suggested in the foregoing description, and others will occur to those of ordinary skill in the art. In particular, the process steps of the method according to the invention will include methods having substantially the same process steps as the method of the invention to achieve substantially the same result. Therefore, all such substitutions and modifications are intended to be within the scope of the invention as defined in the appended claims and their equivalents.

We claim:

1. A phase lock loop (PLL) in a controller of an optical disk system comprising:
    a write phase detector;
    a read phase detector;
    a common read/write module shared by said write and read phase detectors wherein said
    common read/write module comprises:
        a read/write mode selector coupled to said write and read phase detectors; and
        a charge pump coupled to said read/write mode selector;
    a loop filter coupled to said charge pump; and
    a voltage control oscillator (VCO) coupled to said loop filter.

2. The phase lock loop (PLL) of claim 1 wherein said mode selector is a multiplexer.

3. The phase lock loop (PLL) of claim 1 further comprising an additional divider coupled to said write phase detector.

4. The phase lock loop (PLL) of claim 1 further comprising a read divider provided between said voltage control oscillator (VCO) and said read phase detector.

5. The phase lock loop (PLL) of claim 1 further comprising a write divider provided between said voltage control oscillator (VCO) and said write phase detector.

6. The phase lock loop (PLL) of claim 1 wherein said read phase detector is in parallel to said write phase detector.

7. The phase lock loop (PLL) of claim 1 further comprising an encoder coupled to said voltage control oscillator (VCO) for outputting encoded data to said controller.

8. The phase lock loop (PLL) of claim 1 wherein said voltage control oscillator (VCO) outputs a write clock to said write phase detector.

9. The phase lock loop (PLL) of claim 1 wherein said controller is coupled to an optical disk selected from the group consisting of DVD-R/RW, DVD+R/RW (digital video disk rewritable), DVD-RAM (digital video disk random access memory) and CD-RW (compact disk rewritable).

10. The phase lock loop (PLL) of claim 1 wherein said optical disk system is a computer storage system for one selected from the group consisting of a personal computer (PC), workstation, notebook computer, palmtop computer, personal digital assistant (PDA), and wireless computer.

11. A phase lock loop (PLL) in a controller of an optical disk system comprising:
    a write phase detector;
    a read phase detector;
    a common read/write module shared by said write and read phase detectors wherein said common read/write module comprises:
        a write charge pump coupled to said write phase detector;
        a read charge pump coupled to said read phase detector; and
        a read/write mode selector coupled to said write and read charge pumps;
    a loop filter coupled to said mode selector; and
    a voltage control oscillator (VCO) coupled to said loop filter.

12. The phase lock loop (PLL) of claim 11 wherein said mode selector is a multiplexer.

13. The phase lock loop (PLL) of claim 11 further comprising an additional divider connected to said write phase detector.

14. The phase lock loop (PLL) of claim 11 further comprising a read divider provided between said voltage control oscillator (VCO) and said read phase detector.

15. The phase lock loop (PLL) of claim 11 further comprising a write divider provided between said voltage control oscillator (VCO) and said write phase detector.

16. The phase lock loop (PLL) of claim 11 wherein said read charge pump is in parallel to said write charge pump.

17. The phase lock loop (PLL) of claim 11 further comprising an encoder connected to said voltage control oscillator (VCO) for outputting encoded data to said controller.

18. The phase lock loop (PLL) of claim 11 wherein said voltage control oscillator (VCO) outputs a write clock to said write phase detector.

19. The phase lock loop (PLL) of claim 11 wherein said controller is connected to an optical disk selected from the group consisting of DVD-RW, DVD+RW (digital video disk rewritable), DVD-RAM (digital video disk random access memory) and CD-RW (compact disk rewritable).

20. The phase lock loop (PLL) of claim 11 wherein said optical disk system is a computer storage medium for one selected from the group consisting of a personal computer (PC), workstation, notebook computer, palmtop computer, personal digital assistant (PDA), and wireless computer.

21. A phase lock loop (PLL) in a controller of an optical disk system comprising:
    a write phase detector;
    a write divider connected to said write phase detector;
    a read phase detector;
    a multiplexer connected to said write detector and said read detector;
    a charge pump coupled to said multiplexer;
    a loop filter coupled to said charge pump;
    a voltage control oscillator (VCO) coupled to said loop filter;
    a read divider provided between said voltage control oscillator (VCO) and said read phase detector; and
    an additional divider provided between said voltage control oscillator (VCO) and said write phase detector.

22. The phase lock loop (PLL) of claim 21 further comprising an encoder coupled to said voltage control oscillator (VCO) for outputting encoded data to said controller.

23. The phase lock loop (PLL) of claim 21 wherein said read phase detector is in parallel to said write phase detector.

24. The phase lock loop (PLL) of claim 21 wherein said controller is coupled to an optical disk selected from the group consisting of DVD-RW, DVD+RW (digital video disk rewritable), DVD-RAM (digital video disk random access memory) and CD-RW (compact disk rewritable).

25. The phase lock loop (PLL) of claim 21 wherein said optical disk system is a computer storage medium for one selected from the group consisting of a personal computer (PC), workstation, notebook computer, palmtop computer, personal digital assistant (PDA), and wireless computer.

26. A optical disk system comprising:
a controller controlling an optical disk in said optical disk system;
a phase lock loop (PLL) in said controller further comprising:
a write phase detector;
a write divider coupled to said write phase detector;
a read phase detector;
a multiplexer coupled to said write detector and said read detector;
a charge pump coupled to said multiplexer;
a loop filter coupled to said charge pump;
a voltage control oscillator (VCO) coupled to said loop filter;
a read divider provided between said voltage control oscillator (VCO) and said read phase detector; and
an additional divider provided between said voltage control oscillator (VCO) and said write phase detector.

27. The system of claim 26 further comprising an encoder coupled to said voltage control oscillator (VCO) for outputting encoded data to said controller.

28. The system of claim 26 wherein said read phase detector in parallel to said write phase detector.

29. The system of claim 26 wherein said optical disk is one selected from the group consisting of DVD-RW, DVD+RW (digital video disk rewritable), DVD-RAM (digital video disk random access memory) and CD-RW (compact disk rewritable).

30. The system of claim 26 wherein said optical disk system is a computer storage medium for one selected from the group consisting of a personal computer (PC), workstation, notebook computer, palmtop computer, personal digital assistant (PDA), and wireless computer.

31. A computer storage medium comprising:
a controller controlling an optical disk;
a phase lock loop (PLL) in said controller further comprising:
a write phase detector;
a read phase detector in parallel to said write phase detector;
a read/write mode selector coupled to said write detector and said read detector;
a charge pump coupled to said multiplexer;
a loop filter coupled to said charge pump; and
a voltage control oscillator (VCO) coupled to said loop filter.

32. The computer storage medium of claim 31 wherein said mode selector is a multiplexer.

33. The computer storage medium of claim 31 further comprising a an additional divider coupled to said write phase detector.

34. The computer storage medium of claim 31 further comprising a read divider provided between said voltage control oscillator (VCO) and said read phase detector.

35. The computer storage medium of claim 31 further comprising a write divider provided between said voltage control oscillator (VCO) and said write phase detector.

36. The computer storage medium of claim 31 wherein said voltage control oscillator (VCO) outputs a write clock to said write phase detector.

37. The computer storage medium of claim 31 further comprising an encoder coupled to said voltage control oscillator (VCO) for outputting encoded data to said controller.

38. The computer storage medium of claim 31 wherein said read phase detector receives an eight-to-fourteen modulation (EFM) signal.

39. The computer storage medium of claim 31 wherein said optical disk is one selected from the group consisting of DVD-RW, DVD+RW (digital video disk rewritable), DVD-RAM (digital video disk random access memory) and CD-RW (compact disk rewritable).

40. The computer storage medium of claim 31 wherein said computer storage medium is provided in one selected from the group consisting of a personal computer (PC), workstation, notebook computer, palmtop computer, personal digital assistant (PDA), and wireless computer.

41. A method for an optical disk system having a read and write operational modes, the method comprising the steps of:
selecting a mode out of said read and write modes;
if said write mode is selected,
inputting write reference data into a write phase detector;
phase detecting said write reference data at said write phase detector;
respectively outputting a pump-up signal and a pump-down signal to a charge pump from said write phase detector;
respectively sourcing and sinking a charge pump current at said charge pump in accordance with said pump-up and pump-down signals output from said write phase detector;
outputting said charge pump current to a loop filter;
charging a capacitor in said loop filter with a first magnitude if said charge pump current is sourced;
discharging said capacitor in said loop filter with a second magnitude if said charge pump current is sunk; and
ensuring that said first magnitude and said second magnitude are equal by adjusting a voltage control oscillator (VCO) coupled to said write phase detector.

42. The method of claim 41 further comprising the step of outputting a write clock from said voltage control oscillator to said write phase detector.

43. The method of claim 41 further comprising the step of encoding data output from said voltage control oscillator (VCO).

44. The method of claim 41 further comprising the step of dividing said write reference data.

45. The method of claim 41 further comprising the steps of:
if said read mode is selected,
inputting read data into a read phase detector;
phase detecting said read data at said read phase detector;

respectively outputting a read pump-up signal and a read pump-down signal to said charge pump from said read phase detector;

respectively sourcing and sinking a read charge pump current at said charge pump in accordance with said pump-up and pump-down signals output from said read phase detector;

outputting said charge pump current to said loop filter;

charging said capacitor in said loop filter with a first read magnitude if said read charge pump current is sourced;

discharging said capacitor in said loop filter with a second read magnitude if said read charge pump current is sunk; and ensuring that said first read magnitude and said second read magnitude are equal by adjusting said voltage control oscillator (VCO) coupled to said read phase detector.

46. The method of claim 45 further comprising the step of dividing said read data.

47. The method of claim 45 further comprising the step of dividing data output from said voltage control oscillator (VCO).

48. The method of claim 45 wherein said read data are in an eight-to-fourteen modulation (EFM) format.

49. The method of claim 41 wherein said optical disk system includes an optical disk selected from the group consisting of DVD-RW, DVD+RW (digital video disk rewritable), DVD-RAM (digital video disk random access memory) and CD-RW (compact disk rewritable).

50. The method of claim 41 wherein said optical disk system is a computer storage medium for one selected from the group consisting of a personal computer (PC), workstation, notebook computer, palmtop computer, personal digital assistant (PDA), and wireless computer.

51. A phase lock loop (PLL) in a controller of an optical disk system comprising:

a write phase detector for receiving a write reference signal and a VCO output to generate a write detecting signal;

a read phase detector for receiving a read reference signal and the VCO output and to generate a read detecting signal;

a common read/write module coupled to said write and read phase detectors for receiving said write detecting signal and said read detecting signal to generate a current signal, wherein the common read/write module comprises a read/write mode selector and at least one charge pump;

a loop filter coupled to said common read/write module for receiving said current signal to generate a control voltage; and a voltage control oscillator (VCO) coupled to said loop filter for receiving said control voltage to generate said VCO output.

52. The phase lock loop (PLL) of claim 51, wherein the write detecting signal comprises a first pump up signal and a first pump down signal.

53. The phase lock loop (PLL) of claim 51, wherein the read detecting signal comprises a second pump up signal and a second pump down signal.

54. The phase lock loop (PLL) of claim 51, wherein said common read/write module comprise one charge pump, said read/write mode selector coupled to said write and read phase detector; and said charge pump coupled to said read/write mode selector.

55. The phase lock loop (PLL) of claim 51, wherein said common read/write module comprise a first and second charge pumps, said first charge pump coupled to said write phase detector, said second charge pump coupled to said and read phase detector; and said read/write mode selector coupled to said first and second charge pumps.

56. The phase lock loop (PLL) of claim 51 wherein said read/write mode selector is a multiplexer.

57. The phase lock loop (PLL) of claim 51 further comprising a divider coupled to said write phase detector for receiving the write reference signal.

58. The phase lock loop (PLL) of claim 51 further comprising a read divider provided between said voltage control oscillator (VCO) and said read phase detector.

59. The phase lock loop (PLL) of claim 51 further comprising a write divider provided between said voltage control oscillator (VCO) and said write phase detector.

* * * * *